UNITED STATES PATENT OFFICE.

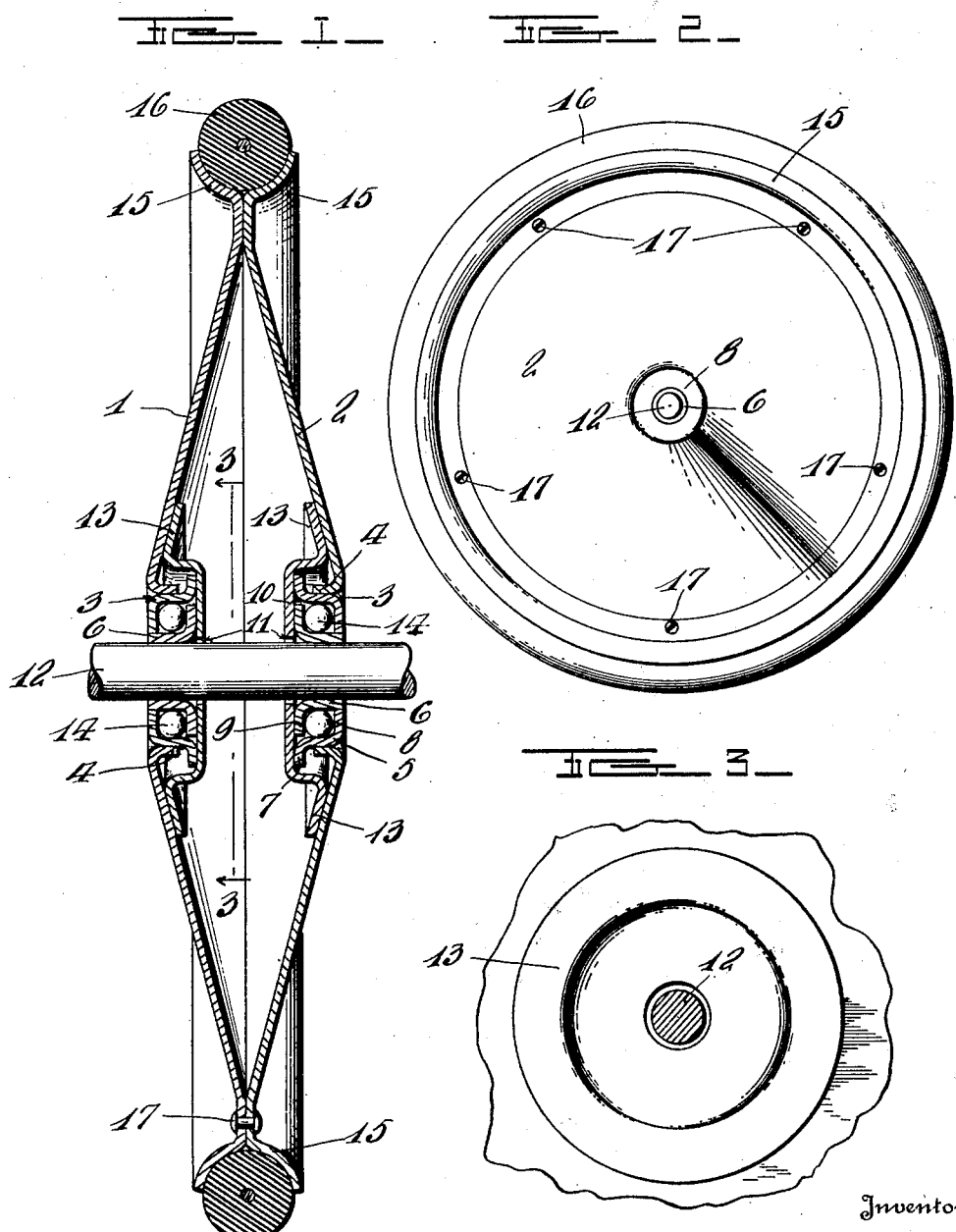

GEORGE H. PALMER, OF LANSING, MICHIGAN, ASSIGNOR TO DAIL STEEL PRODUCTS COMPANY, OF LANSING, MICHIGAN, A CORPORATION OF MICHIGAN.

BALL-BEARING DISK WHEEL.

1,408,825.　　　　Specification of Letters Patent.　　Patented Mar. 7, 1922.

Application filed November 23, 1921. Serial No. 517,226.

*To all whom it may concern:*

Be it known that I, GEORGE H. PALMER, a citizen of the United States, residing at Lansing, in the county of Ingham and State of Michigan, have invented certain new and useful Improvements in Ball-Bearing Disk Wheels, of which the following is a specification.

This invention relates to certain new and useful improvements in wheels of that class known as disk wheels and it has for its objects among others to provide a simple, cheap, yet durable and strong ball bearing disk wheel which, although designed primarily for toy vehicles, is applicable to many other purposes, and it is to be understood that the invention is not restricted to any particular use to which the wheel may be put.

It has for a further object to provide a strong, compact wheel of few parts, those readily assembled, and the ball bearings so formed that the balls shall be kept entirely free from dust and dirt, the ball races being held in place by cups which are secured to the interior of the disks by spot welding or otherwise.

Other objects and advantages of the invention will hereinafter appear and the novel features thereof will be particularly pointed out in the appended claims.

The invention, in its preferred form, is clearly illustrated in the accompanying drawing, which, with the numerals of reference marked thereon, form a part of this specification, and in which—

Figure 1 is a substantially central section through the wheel with the axle in place and broken away.

Figure 2 is a face view of the wheel on a smaller scale.

Figure 3 is a section on the line 3—3 of Figure 1, looking in the direction of the arrows, with the disk broken away.

Like numerals of reference indicate like parts throughout the different views.

The improved wheel is composed of two disks 1 and 2, similar in all respects, being exact duplicates of each other, the disks being pressed or otherwise formed into the desired shape, it being understood that the cross sectional contour thereof may be varied, and at the center of each there is formed an opening 3, the walls of which are bent inward to form the annular inwardly extending flange 4. This opening is large enough to receive the ball races 5 and 6. The former is constructed with an inner annular flange 7 which extends outward toward the periphery of the wheel and the outer flange 8 which extends toward the axial center of said wheel. The ball race 6 has the flange 9 at its inner end which extends in the same direction as the flange 7 of the ball race 5, the annular wall of the ball race 6 finding a bearing against the flange 8 of the ball race 5, as seen clearly in Figure 1. The ball races are held in place by a cup 10 having an axial opening 11 for the passage of the axle 12, and a terminal flange 13 which follows the contour of the inner wall of the disk and is secured to the inner face thereof by spot welding or otherwise, and thus the ball races are held firmly in place. The ball races 6 fit tightly on the axle 12, which latter is stationary, while the ball races 5 revolve about the same with the wheel on the balls 14 disposed within the ball races, as seen clearly in Figure 1.

The peripheral margin of each disk is expanded to form one-half 15 of a rim which may be of any desired form and adapted to conform to the shape of the tire 16 to be used and within which rim the said tire is firmly held.

The two disks are firmly secured together adjacent the rims by suitable means, as the rivets or the like 17.

In assembling the parts of the wheel, the ball races and the balls are mounted in place in the cups 10 and placed in position in the opening 3 of the disk and the cups riveted or spot welded to the disk upon the inner wall thereof, after which the two disks are placed together and riveted or otherwise secured together at their margins. This completes the wheel, ready for placing upon the axle, which latter fits tightly in the ball races 6, it being understood, of course, that each disk is provided with the ball races, balls and cup, as shown in Figure 1.

Modifications in detail may be resorted to without departing from the spirit of the invention or sacrificing any of its advantages.

What is claimed as new is:—

1. A wheel composed of two like disks, ball races disposed within openings in the disks, balls in said races, and means retaining the ball races upon the inner faces of the disks and secured to the latter.

2. A disk wheel comprising two like disks having their margins shaped to form a tire-receiving rim, ball races disposed within axial openings in said disks and cups retaining the ball races and secured to the inner walls of the disks.

3. A disk wheel comprising two like disks having their margins shaped to form a tire-receiving rim, ball races disposed within axial openings in said disks, cups retaining the ball races and secured to the inner walls of the disks, and means securing the disks together adjacent said rim.

4. A disk wheel comprising two like disks each with an axial opening with an inwardly extending flange, oppositely disposed ball races within said openings and adapted to receive balls between them, and cups retaining said ball races and having flanges conforming to the contour of and secured to the inner walls of the disks.

5. A ball bearing disk wheel composed of two like disks each with an axial opening having an inwardly extended flange, ball races within said openings and having a bearing against said flanges, opposed ball races within the first-named ball races and adapted to receive the axle, and cups loosely receiving the axle and retaining said ball races and secured to the inner faces of the disks.

6. A ball bearing disk wheel composed of two like disks each with an axial opening having an inwardly extended flange, ball races within said openings and having a bearing against said flanges, opposed ball races within the first-named ball races and adapted to receive the axle, and cups loosely receiving the axle and retaining said ball races and secured to the inner faces of the disks, the inner ball races fitting tightly on the axle and stationary with relation thereto and the outer ball races revolving about the same with the wheel supported on balls in said races.

In testimony whereof I affix my signature.

GEORGE H. PALMER.